United States Patent [19]

Nakao et al.

[11] Patent Number: 4,982,389
[45] Date of Patent: Jan. 1, 1991

[54] MAGNETO-OPTICAL RECORDER WITH COMPENSATION FOR VARIATION IN APPLIED MAGNETIC FIELD INTENSITY ON A RECORDING MEDIUM

[75] Inventors: Takeshi Nakao, Sagamihara; Masahiro Ojima, Tokyo, both of Japan

[73] Assignee: Hitachi, Ltd., Tokyo, Japan

[21] Appl. No.: 145,313

[22] Filed: Jan. 19, 1988

[30] Foreign Application Priority Data

Jan. 30, 1987 [JP]  Japan .................................. 62-18390

[51] Int. Cl.$^5$ ............................................. G11B 13/04
[52] U.S. Cl. ....................................... 369/13; 360/114; 369/116
[58] Field of Search ...................... 369/13, 116, 32, 45, 369/110, 106; 360/114, 59; 365/122

[56] References Cited

U.S. PATENT DOCUMENTS

| 4,426,693 | 1/1984 | Satoh et al. | 369/116 |
| 4,472,748 | 9/1984 | Kato et al. | 360/59 |
| 4,495,530 | 1/1985 | Yanagida | 369/13 |
| 4,710,908 | 12/1987 | Ohshima et al. | 369/116 |
| 4,736,353 | 4/1988 | Kasai et al. | 369/32 |
| 4,745,587 | 5/1988 | Maeda et al. | 369/32 |

FOREIGN PATENT DOCUMENTS 57-94906   6/1982   Japan ..................................... 369/13

Primary Examiner—Stuart S. Levy
Assistant Examiner—Hoa Nguyen
Attorney, Agent, or Firm—Antonelli, Terry, Stout & Kraus

[57]  ABSTRACT

A magneto-optical recorder comprising an optical head for projecting a light beam on a magneto-optical recording medium so as to form a light spot thereon, a magnetic head disposed at a predetermined distance from the optical head and applying a magnetic field modulated according to information to be recorded to the magneto-optical recording medium; and light intensity controlling means for varying the intensity of the light spot, responding to at least one of a focusing error signal indicating deviations of the light spot from the magneto-optical recording medium and a position signal indicating the relative position of the magneto-optical recording medium and the optical head, wherein, even if the intensity of the magnetic field applied to the recording medium varies, depending on vertical oscillations of the recording medium or on the position of the light spot, influences of variations in the intensity of the applied magnetic field are compensated by varying the intensity of the light spot so that fluctuations in the amount of recorded signals and imperfect erasing are suppressed.

10 Claims, 5 Drawing Sheets

FIG. 2A INTENSITY OF MAGNETIC FIELD GENERATED BY MAGNETIC HEAD
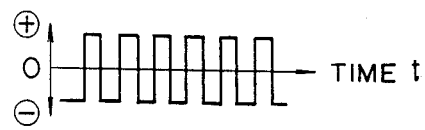
FIG. 2B INTENSITY OF MAGNETIC FIELD ON RECORDING MEDIUM
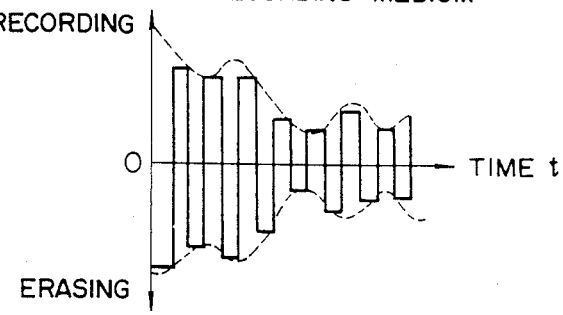
FIG. 2C ACTUATOR DRIVING SIGNAL
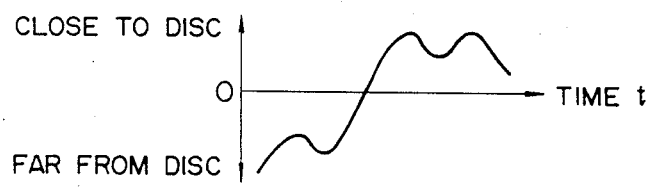
FIG. 2D INTENSITY OF LIGHT SPOT
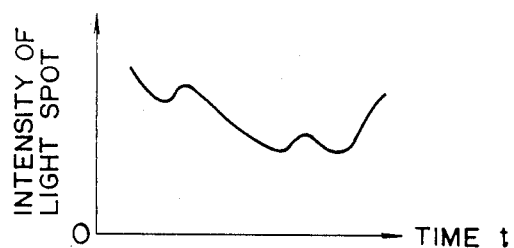

FIG. 4A INTENSITY OF MAGNETIC FIELD GENERATED BY MAGNETIC HEAD
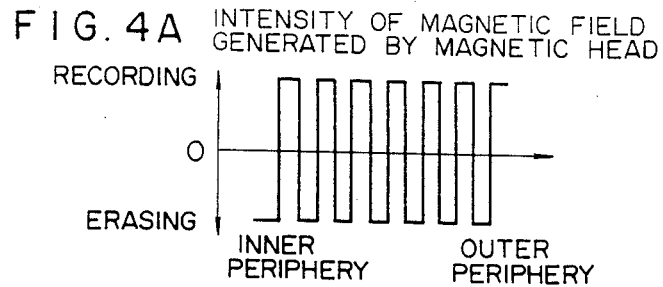
FIG. 4B SEMICONDUCTOR LASER DRIVING CURRENT
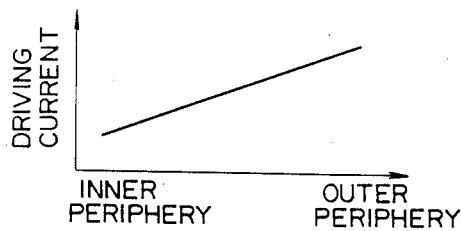
FIG. 4C INTENSITY OF LIGHT SPOT (1)
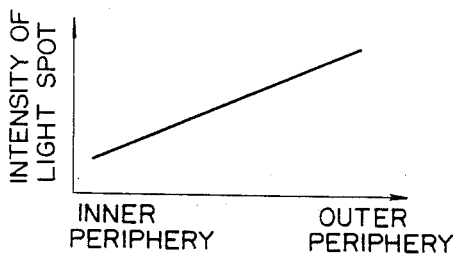
FIG. 4D INTENSITY OF LIGHT SPOT (2)
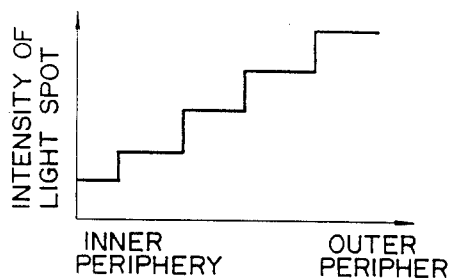

MAGNETO-OPTICAL RECORDER WITH COMPENSATION FOR VARIATION IN APPLIED MAGNETIC FIELD INTENSITY ON A RECORDING MEDIUM

CROSS-REFERENCE TO RELATED APPLICATIONS

This application relates to the patent application Ser. Nos. 828,354 now U.S. Pat. No. 4,742,218 and 932,578 now U.S. Pat. No. 4,803,674, filed on Feb. 11, 1986 and Nov. 20, 1986, respectively.

BACKGROUND OF THE INVENTION

This invention relates to a magneto-optical recorder, by which overwrite is possible, and in particular to a magneto-optical recorder, by which overwrite is possible and which can fulfill certain determined recording/erasing conditions.

Heretofore, as magneto-optical recorders by which overwrite is possible, a method, by which two light spots are used, as described in JP-A No. 60-35303, and a method, by which the magnetic field applied to the recording film is modulated, depending on information to be recorded, as described in JP-A Nos. 51-107121, 59-215008, etc., can be cited.

However, by either one of the methods no special attention is paid to fulfill always the optimum recording/erasing conditions, even if the disc fluctuates, or the position of recorded information varies between the inner and outer peripheries of the disc. Therefore there was a problem that fluctuations in the amount of recorded signals or imperfect erasing occurred.

SUMMARY OF THE INVENTION

The object of this invention is to provide a magneto-optical recorder, by which overwrite is possible and by means of which the optimum recording/erasing conditions can be always fulfilled independently of fluctuations of the disc or whether the position of recorded information is at the inner periphery or at the outer periphery of the disc.

The magneto-optical recorder according to this invention is characterized in that it comprises means for detecting the relative position between the recording medium and the magnetic field applying means or means for detecting the position of the light spot focused on the surface of the recording medium and means for varying the intensity of the light spot projected to the recording medium by using signals coming from the means for detecting the position.

According to the magneto-optical recorder of this invention, it is possible to effect recording/erasing always under the optimum conditions, while compensating the influences of variations in the intensity of the applied magnetic field, by varying the intensity of the light spot, even if the intensity of the magnetic field applied to the recording medium varies, depending on the fluctuations of the recording medium or the position of the light spot on the recording medium.

BRIEF DESCRIPTION OF THE DRAWINGS

FIGS. 2A to 2D indicate waveforms for explaining the first embodiment;

FIGS. 4A to 4D indicate graphs for explaining the second embodiment; and

DESCRIPTION OF THE PREFERRED EMBODIMENTS

Figure 1:
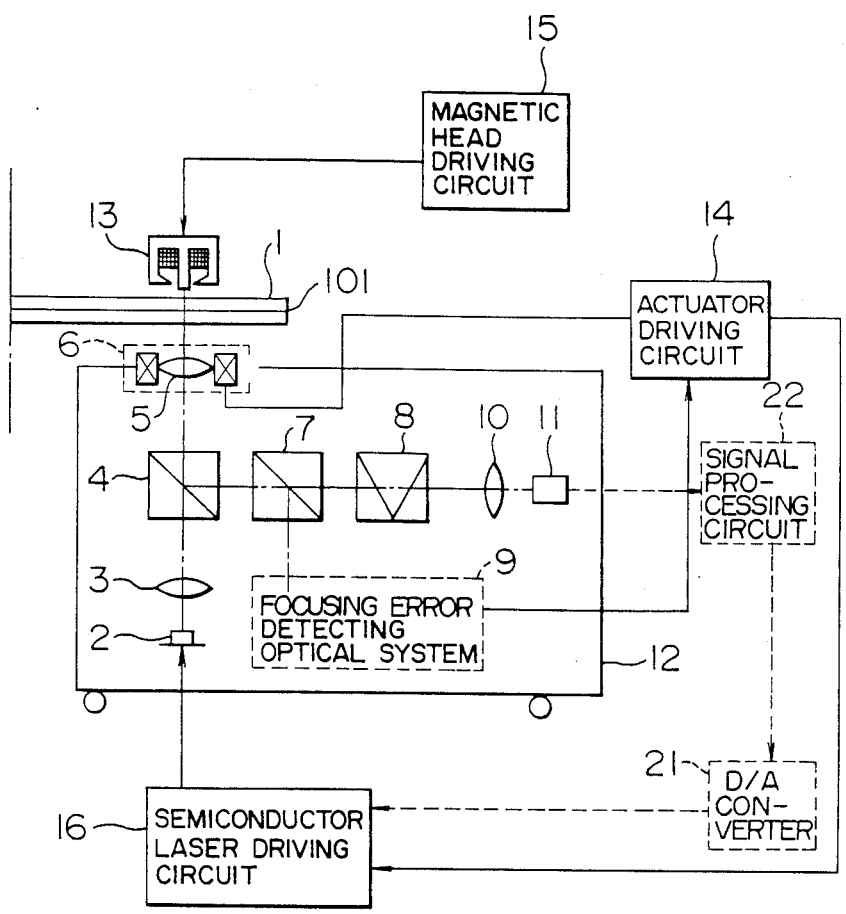
FIG. 1 is a block diagram illustrating the construction of a first embodiment of this invention.

FIG. 1 is a scheme showing the basic construction of a magneto-optical device, which is an embodiment of this invention, in which reference numeral 1 represents a magneto-optical disc including magneto-optical recording medium 101 obtaining the magneto-optical effect. Light emitted by a semiconductor laser device 2 is transformed by a collimate lens 3 into a parallel beam and injected through a beam splitter 4 to a focusing lens 5 so that it forms a small spot on the magneto-optical recording medium 101 of the disc 1. The focusing lens 5 is mounted on a voice coil, which is a focal point regulating means, so that it can follow vertical deviations of the disc 1. Light reflected by the disc 1 is led to a focusing error detecting optical system 9 and an analyzer 8 by a beam splitter 7 after having passed through the focusing lens 5 and having been separated by the beam splitter 4. The analyzer 8 has a property to transmit only light having a specified polarization plane. Consequently the rotational angle of the polarization plane corresponding to the direction of the magnetization on the disc 1 is transformed into variations in amount of light by this analyzer 8. After that, the light thus obtained is collected by a lens 10 in a photodetector 11 and transformed into an electrical signal.

For recording information the magneto-optical recording medium 101 on the disc 1 is heated over the Curie temperature by making the semiconductor laser device 2 emit light with a high power so that it loses its magnetization. At this time a magnetic head 13, which is a magnetic field applying means, applies a magnetic field modulated according to information to be recorded to the magneto-optical recording film 101 by means of a driving circuit 15 in order to record the information. According to this method, since the magnetization is lost once at the recording, and therefore even if recording is newly effected at a portion, where information has been already recorded, old recorded information does not remain, it is possible to erase old information by overwriting, i.e. superposing new information on old one.

The optical head 13 is formed in one body with an optical head 12. Owing to this fact it can hold the distance between them constant and at the same time it is so controlled that it is located always right above the light spot on the disc. It is not always necessary to form them in one body, but in this case means for holding the distance between them constant and magnetic head displacing means for locating the magnetic head right above the light spot are necessary.

The relative position of the disc 1 and the focusing lens 5 is detected by the focusing error detecting optical system 9. As the focusing error detecting optical system 9 various known systems can be used (cf. e.g. U.S. Ser. No. 828,354). This signal is inputted in an actuator driving circuit 14 and the relative position of the disc and the focusing lens is held constant by driving a focusing lens actuator 6. Since the relative position of the focusing lens with respect to the optical head can be known by using the actuator driving signal, it is possible to know the relative position of the disc with respect to the optical head by using the same signal. Taking into account that the distance between the optical head 12 and the magnetic head 13 is constant, for the reason described above it is possible to know the distance between the magneto-optical recording medium 101 on the disc and the magnetic head 13 by using the actuator driving signal.

When the distance between the magneto-optical recording medium and the magnetic head varies, the intensity of the magnetic field applied to the recording medium varies. At this time, if the intensity of the light spot focused on the recording medium is held constant, fluctuations are produced in the amplitude of the signal to be recorded. Therefore the actuator driving signal is inputted in a semiconductor laser driving circuit 16 so that the laser driving current is varied depending on the distance between the recording medium and the magnetic head and the intensity of the focused light spot is varied so as to fulfill the optimum recording/erasing conditions.

FIG. 2 indicates variations in the intensity of the magnetic field and that of the focused light spot. FIG. 2A represents variations in the intensity of the magnetic field generated by the magnetic field and FIG. 2B shows variations in the effective magnetic field applied to the recording medium due to vertical oscillations of the disc. When the distance between the magnetic head and the recording medium is small, they are great and when the distance is great, they are small. At this time the actuator driving signal varies, as indicated in FIG. 2C. For example, in the case where the optimum recording/erasing conditions are fulfilled by decreasing the intensity of the light spot, when the applied magnetic field is strong and by increasing the intensity of the light spot, when the applied magnetic field is weak, the actuator signal indicated in FIG. 2C is inputted in the laser driving circuit 16 so that the intensity of the light spot varies, as indicated in FIG. 2D. In this way it is possible to fulfill always the optimum recording/erasing conditions.

Figure 3:
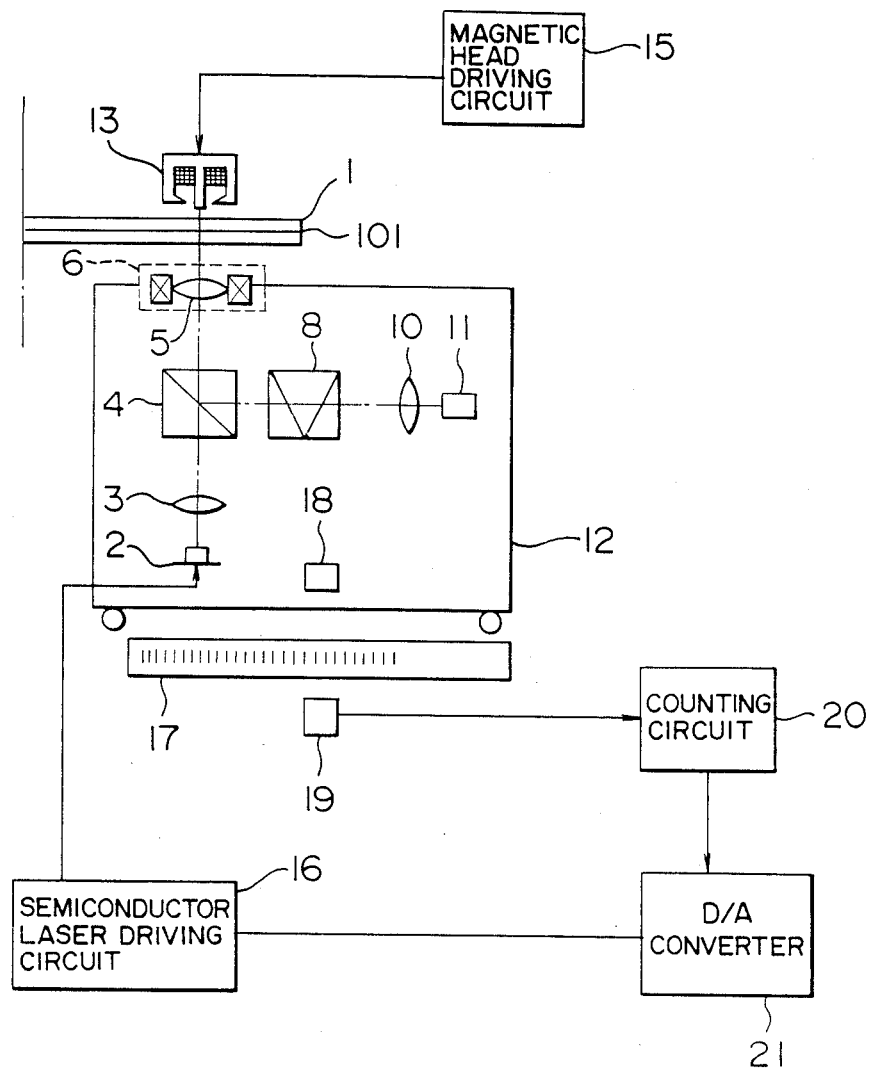
FIG. 3 is a block diagram illustrating the construction of a second embodiment of this invention.

Now the second embodiment of this invention will be explained, referring to FIG. 3. The feature thereof consists in that the intensity of the focused light spot is varied, depending on the position in the radial direction of the light spot focused on the disc. In this embodiment the position of the light spot is detected by using an external scale. The external scale consists of a light source 18, a photodetector 19 and a moiré scale 17 disposed therebetween and one of the light source 18 and the photodetector 19 or the moiré scale 17 is moved, linked with the optical head 12. The light source 18 and the photodetector 19 are moved together with the movement of the optical head 12 and the moiré scale 17 is fixed. The techniques for detecting the position of the light spot by means of the external scale are known (cf. e.g. U.S. Pat. No. 4,650,332). Since the amount of light received by the photo-detector 19 varies, depending on the movement of the optical head 12, the position of the optical head 12 in the radial direction can be detected by pulsing the output of the photodetector 19 and by counting the number of pulses by means of a counting circuit 20. In this way it is possible to know the position of the light spot at that time. The output signal of the counting circuit 20 is inputted through a D/A converter 21 in the laser driving circuit 16 and varies the emission intensity of the semiconductor laser device so that the optimum recording/erasing conditions can be fulfilled, depending on the position of the light spot in the radial direction of the disc. FIG. 4B shows an example of the semiconductor laser driving current. This indicates that observed in the case where recording is effected continuously from the inner periphery to the outer one, i.e. the case where it is necessary that the intensity of the light spot is small at the inner periphery and increases with decreasing distance to the outer periphery. FIG. 4A indicates the intensity of the magnetic field generated by the magnetic head, FIG. 4B the semiconductor driving current and FIG. 4C the intensity of the light spot.

Although, in the above, the case where the intensity of the light spot is varied continuously was explained, it may be possible that the disc is divided into several regions in the radial direction of the disc and the intensity of the light spot is varied stepwise, as indicated in FIG. 4D. Further it is also possible to set the intensity of the light spot so that it is high at the inner periphery and low at the outer periphery.

Figure 5:
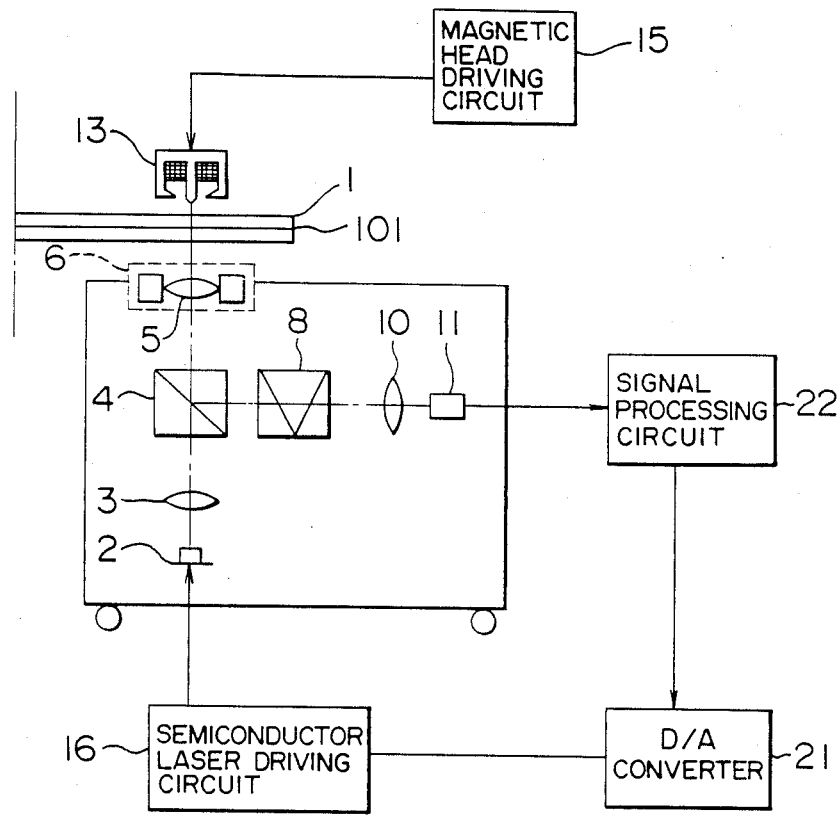
FIG. 5 is a block diagram illustrating the construction of a variant of the second embodiment of this invention.

FIG. 5 indicates a variant of the second embodiment of this invention. This is the case the position of the light spot is detected by using light reflected by the disc. This embodiment is useful for the case where recording medium is used, in which the track address, e.g. the track address by pits, is previously recorded for every track. The position of the light spot is detected by inputting the output of the photodetector 11 in a signal processing circuit 22 and reading out the track address recorded on the disc. The track address signal detected by the signal processing circuit 22 is inputted through the D/A converter 21 in the laser driving circuit 16 and varies the intensity of the light output of the semiconductor laser 2 so that the optimum recording/erasing conditions are fulfilled, depending on the position of the light spot in the radial direction of the disc. Since the aspect of the semiconductor laser drive is the same as that described for the second embodiment, explanation thereof will be omitted. Further, although in FIGS. 3 and 5 no out-focus detecting optical system is indicated, it is a matter of course that it is necessary.

Although the first and the second embodiments were explained separately in the above, of course they may be performed at the same time. For example, as indicated by broken lines in FIG. 1, a signal processing circuit 22 and a D/A converter are disposed and the semiconductor laser driving current is controlled by both the actuator driving signal and the light spot position signal. It is a matter of course that an external scale may be disposed, as indicated in FIG. 3, in order to detect the position of the light spot.

As explained above, according to this invention, since recording/erasing can be effected always under the optimum conditions, even if fluctuations of the disc occur or the position of the light spot varies, it is possible to suppress fluctuations of the amount of recorded signals and at the same time to prevent imperfect erasing.

We claim:
1. A magneto-optical recorder comprising:
   a focusing lens for focusing a light beam so as to form a light on a magneto-optical recording medium;
   a focusing error detecting optical system for detecting the relative position of said recording medium and said focusing lens at least during recording of information on said magneto-optical recording medium and providing a focusing error signal indicative thereof during said recording;

an optical head including said focusing lens, said focusing error detecting optical system and a focal point regulating means for maintaining a predetermined distance between said magneto-optical recording medium and said focusing lens in accordance with the focusing error signal detected by said focusing error detecting optical system;

magneto field applying means for applying a magnetic field modulated according to information to be recorded to said magneto-optical recording medium for enabling recording of the information on said magneto-optical recording medium; and means for varying the intensity of the light spot focused on said magneto-optical recording medium at least during said recording in accordance with said focusing error signal provided during said recording so as to compensate for changes in intensity of applied magnetic field on said magneto-optical recording medium during said recording.

2. A magneto-optical recorder according to claim 1, further comprising means for detecting the position of the light spot focused on said recording medium and means for varying the intensity of said light spot, depending on the position of said light spot.

3. A magneto-optical recorder according to claim 2, wherein said means for detecting the position of the light spot consists of an external scale outputting a pulse, every time when said optical head moves over a predetermined distance, and means for counting pulses thus outputted.

4. A magneto-optical recorder according to claim 2, wherein said means for detecting the position of the light spot is means for reading out the address of the track where said light spot is present.

5. A magneto-optical recorder comprising:
an optical head for projecting a light beam on a magneto-optical recording medium so as to form a light spot thereon;

magnetic head disposed at a predetermined distance from said optical head and applying a magnetic field modulated according to information to be recorded to said magneto-optical recording medium; and light intensity controlling means for varying the intensity of said light spot during recording in accordance with at least one of a focusing error signal provided during said recording indicating deviations of said light spot from said magneto-optical recording medium and a position signal indicating the relative position of said magneto-optical recording medium and said optical head so as to at least compensate for changes in intensity of the applied magnetic field on said magneto-optical recording medium.

6. A magneto-optical recorder according to claim 5, wherein said light intensity controlling means is a laser driving circuit for controlling current driving a laser light emitting said light beam.

7. A magneto-optical recorder according to claim 5, wherein said optical head comprises an external scale outputting a pulse, every time when said optical head moves over a predetermined distance, and means for counting pulses thus outputted, the output of said means for counting pulses being used as said position signal.

8. A magneto-optical recorder according to claim 6, wherein the address of the track where said light spot is present is used as said position signal.

9. A magneto-optical recorder according to claim 1, wherein a distance between said magnetic field applying means and said magneto-optical recording medium varies due to vertical oscillations of said magneto-optical recording medium thereby changing the intensity of the applied magnetic field on said magneto-optical recording medium, said means for varying the intensity of the light spot focused on said recording medium varying the intensity so as to at least compensate for changes in the intensity of the applied magnetic field on said magneto-optical recording medium due to the vertical oscillations thereof.

10. A magneto-optical recorder according to claim 5, wherein said light intensity controlling means is responsive to said focusing error signal and said position signal, and wherein a distance between said magnetic head and said magneto-optical recording medium varies due to vertical oscillations of said magneto-optical recording medium thereby changing the intensity of the applied magnetic field on said magneto-optical recording medium, said light intensity controlling means varying the intensity of the light spot focused on said recording medium so as to at least compensate for changes in the intensity of the applied magnetic field on said magneto-optical recording medium due to the vertical oscillations thereof.

* * * * *